United States Patent
Liang et al.

(10) Patent No.: US 10,882,797 B2
(45) Date of Patent: Jan. 5, 2021

(54) BARIUM TITANATE FOAM CERAMICS LOADED WITH MICRO/NANO SILVER AND PREPARATION METHOD THEREOF

(71) Applicant: SOOCHOW UNIVERSITY, Suzhou (CN)

(72) Inventors: Guozheng Liang, Suzhou (CN); Longhui Zheng, Suzhou (CN); Aijuan Gu, Suzhou (CN); Tiekuang Ding, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 246 days.

(21) Appl. No.: 16/069,160

(22) PCT Filed: Nov. 29, 2016

(86) PCT No.: PCT/CN2016/107796
§ 371 (c)(1),
(2) Date: Jul. 10, 2018

(87) PCT Pub. No.: WO2017/121203
PCT Pub. Date: Jul. 20, 2017

(65) Prior Publication Data
US 2019/0031572 A1 Jan. 31, 2019

(30) Foreign Application Priority Data
Jan. 11, 2016 (CN) .......................... 2016 1 0014635

(51) Int. Cl.
*C04B 35/468* (2006.01)
*C04B 41/88* (2006.01)
(Continued)

(52) U.S. Cl.
CPC .......... *C04B 38/106* (2013.01); *C04B 35/468* (2013.01); *C04B 35/6365* (2013.01);
(Continued)

(58) Field of Classification Search
CPC ................................................... C04B 38/061
See application file for complete search history.

(56) References Cited

U.S. PATENT DOCUMENTS 4,024,212 A * 5/1977 Dore .................. B01D 39/2093
264/44

FOREIGN PATENT DOCUMENTS

CN  102951922 A  3/2013
CN  104193396 A  12/2014
(Continued)

OTHER PUBLICATIONS

Xie, Liyuan, et al. "Core-Satellite Ag@BaTiO3 Nanoassemblies for Fabrication of Polymer Nanocomposites with High Discharged Energy Density, High Breakdown Strength and Low Dielectric Loss." Physical Chemistry Chemical Physics, vol. 15, No. 40, 2013, p. 17560., doi:10.1039/c3cp52799a. (Year: 2013).*
(Continued)

*Primary Examiner* — Alison L Hindenlang
*Assistant Examiner* — Andrés E. Behrens, Jr.
(74) *Attorney, Agent, or Firm* — SZDC Law P.C.

(57) ABSTRACT

Disclosed are a micrometer/nanometer silver-loaded barium titanate foam ceramic and a preparation method therefor. An organic additive is used as an auxiliary; deionized water is used as a solvent; nanometer barium titanate is used as a ceramic raw material; and same are mixed and ground so as to form a slurry. A pre-treated polymer sponge is impregnated in the slurry for slurry coating treatment and a barium titanate foam ceramic blank is obtained after drying; and then a barium titanate foam ceramic is obtained through sintering. Through dopamine modification, micrometer/nanometer silver is in-situ deposited on a skeleton surface so as to obtain a modified micrometer/nanometer silver-loaded barium titanate foam ceramic. The modified micrometer/
(Continued)

nanometer silver-loaded barium titanate foam ceramic is then put into a newly prepared Tollens' reagent for further reduction so as to obtain a micrometer/nanometer silver-loaded barium titanate foam ceramic with a three-dimensional network skeleton structure.

10 Claims, 4 Drawing Sheets

(51) Int. Cl.
    *C04B 38/10*     (2006.01)
    *C04B 35/634*     (2006.01)
    *C04B 38/06*     (2006.01)
    *C04B 41/00*     (2006.01)
    *C04B 41/51*     (2006.01)
    *C04B 35/636*     (2006.01)
    *C04B 38/00*     (2006.01)
    *C08L 75/04*     (2006.01)
    *C04B 111/20*     (2006.01)
    *C08L 25/06*     (2006.01)
    *C08L 27/06*     (2006.01)
(52) U.S. Cl.
    CPC .. *C04B 35/63416* (2013.01); *C04B 35/63424* (2013.01); *C04B 35/63444* (2013.01); *C04B 35/63468* (2013.01); *C04B 38/0054* (2013.01); *C04B 38/0615* (2013.01); *C04B 41/009* (2013.01); *C04B 41/5116* (2013.01); *C04B 41/88* (2013.01); *C08L 75/04* (2013.01); *C04B 2111/2092* (2013.01); *C04B 2235/3236* (2013.01); *C04B 2235/408* (2013.01); *C04B 2235/5454* (2013.01); *C04B 2235/606* (2013.01); *C04B 2235/6028* (2013.01); *C04B 2235/6562* (2013.01); *C04B 2235/74* (2013.01); *C08L 25/06* (2013.01); *C08L 27/06* (2013.01)

(56) References Cited

FOREIGN PATENT DOCUMENTS

| CN | 105622162 A | 6/2016 | |
| CN | 107778026 | * 8/2016 | ........... C04B 35/468 |

OTHER PUBLICATIONS

Luo, Suibin, et al. "Nano Ag-Deposited BaTiO3 Hybrid Particles as Fillers for Polymeric Dielectric Composites: Toward High Dielectric Constant and Suppressed Loss." ACS Applied Materials & Interfaces, vol. 6, No. 1, 2013, pp. 176-182., doi:10.1021/am404556c. (Year: 2013).*

CN-107778026 (Yumin) Aug. 2016 (online machine translation), [Retrieved on Jun. 8, 2020]. Retrieved from: Espacenet (Year: 2016).*

Wucherer, Laurel etc. "Sythnesis and Characterization of BaTiO3-Based Foams with a Controlled Microstructure." International Journal of Applied Ceramic Technology., vol. 6, No. 6, Dec. 31, 2009 (Dec. 31, 2009), ISSN: 1744-7402, pp. 651-660.

* cited by examiner

BARIUM TITANATE FOAM CERAMICS LOADED WITH MICRO/NANO SILVER AND PREPARATION METHOD THEREOF

This application is a the national stage of PCT/CN2016/107796, filed on Nov. 29, 2016, which claims priority to Chinese Patent Application No. 201610014635.6, filed Jan. 11, 2016, which is incorporated by reference for all purposes as if fully set forth herein.

FIELD OF THE INVENTION

The present invention relates to a kind of barium titanate foam ceramics loaded with micro/nano silver and preparation method thereof, it belongs to technical fields of foam ceramics.

BACKGROUND OF THE INVENTION

Foam ceramic (FC) is a new type of porous material with good chemical stability, high strength, high temperature resistance and thermal shock resistance, low density, high porosity and large specific surface area, etc, so FC shows tremendous application foreground in the field of automobile exhaust devices, wastewater treatment, energy-saving insulation, chemical catalysis and biological materials, etc.

However, there are few kinds of available FCs, according to their main compositions, they are divided into three categories: silicon carbide (SiC), alumina ($Al_2O_3$) and silicon nitride ($Si_3N_4$), etc. Obviously, these materials can only be applied to specific occasions, in order to fully exploit the advantages of FCs in more fields, more kinds of FCs need to be developed.

At present, the mature methods for preparing FCs are foaming process, adding pore forming agents, and polymer foam replication. Among them, the polymer foam replication has the advantages of simple process and batch production. However, most of the raw materials and inorganic additives for preparing ceramic slurry are ceramics with microns or larger sizes by the process, and they should be ground for a long time to get slurry with uniform dispersion and good fluid, this is not conducive to larger scale production.

Barium titanate is a kind of ceramic with excellent mechanical strength, high dielectric constant, low dielectric loss, prominent ferroelectric, piezoelectric and positive temperature coefficient properties, which is ideal for preparing materials with high dielectric, ferroelectric and piezoelectric effects. However, so far, there has been no report about barium titanate foam ceramics and preparation method thereof.

Note that, generally, the available FCs are end-use products that are used directly. Multi-function and high-performance have been the development direction of material field. Also, the threat induced by environmental pollution to human life and health has reached a high level ever since, and antibacterial property has become a highly concerned issue in the development of new materials. Barium titanate foam ceramics with antibacterial property and preparation methods have not been reported yet.

SUMMARY OF THE INVENTION

The present invention deals with solving problems of existing technologies, and providing a kind of barium titanate foam ceramics loaded with micro/nano silver with antibacterial property and preparation method thereof.

To achieve above purpose, the present invention adopts the following technical solution:

A preparation method of barium titanate foam ceramics loaded with micro/nano silver, wherein comprising the following steps:

(1) by weight, 100 parts of nano barium titanate and 30 to 120 parts of an aqueous solution of organic binder with a concentration of 1 to 15 wt % are sufficiently ground to obtain a slurry A; 10 to 80 parts of an aqueous solution of organic rheological agent with a concentration of 0.5 to 3 wt % are added into the slurry A, and the mixture is sufficiently ground to obtain a slurry B; 20 to 80 parts of an aqueous solution of organic dispersant with a concentration of 0.5 to 3 wt % are added into the slurry B, and the mixture is sufficiently ground to obtain a slurry C;

(2) a polymer sponge having a specification of 15 to 35 PPI is soaked in an aqueous solution of sodium hydroxide with a concentration of 5 to 20 wt %, after heated up to 50 to 75° C. and kept at that temperature for 2 to 6 h, the polymer sponge is taken out and washed with deionized water, following by drying to obtain a polymer sponge D; at room temperature, the polymer sponge D is soaked in an aqueous surfactant solution with a concentration of 0.5 to 3 wt % for 2 to 6 h, then took out and removed the excess surfactant, after dried at 40 to 80° C., a pretreated polymer sponge E is obtained;

(3) the pretreated polymer sponge E is soaked in the slurry C prepared in step (1), and maintained for 1 to 10 min at room temperature, after hanging pulp, the excess slurry in the sponge is removed by extrusion, and the sponge is dried at 40 to 80° C.; repeating processes of hanging pulp and drying for 1 to 7 times, a green body of foam ceramics based on barium titanate is obtained;

(4) the green body of barium titanate foam ceramics prepared in step (3) is heated from room temperature to 100-300° C. at a rate of 0.5-5° C./min, and then raised to 500-700° C. at a rate of 0.5-5° C./min and maintained at that temperature for 0.5-2 h, after that, continuously heated to 1000-1500° C. at a rate of 2-10° C./min and kept at that temperature for 1-5 h, after the furnace is cooled to room temperature, barium titanate foam ceramics are obtained;

(5) using buffering agent or buffer, water and dopamine hydrochloride to prepare dopamine aqueous solution with a concentration of 0.5-10 g/L; of which pH value is adjusted to 8.3-8.8 with alkali to obtain solution F; barium titanate foam ceramics prepared in step (4) are soaked in solution F and kept at room temperature for 1 to 24 h, followed by washing with deionized water and drying successively, to obtain dopamine-modified barium titanate foam ceramics;

(6) by volume, 4 to 20 parts of stabilizer aqueous solution with a concentration of 0.1-1 wt % are added into 100 parts of a fresh ammoniacal silver solution with a concentration of 0.03-0.3 mol/L, the mixture is uniformly mixed to obtain solution G; the dopamine-modified barium titanate foam ceramics prepared in step (5) are soaked in solution G and kept at room temperature for 0.5-24 h to obtain barium titanate foam ceramics loaded with nano silver, into which 50-300 parts of reducing agent aqueous solution having a concentration of 1-30 g/L are added and kept at room temperature for 0.1-5 h, followed by washing with deionized water and drying successively, to obtain barium titanate foam ceramics loaded with micro/nano silver.

The polymer materiel of said polymer sponge is selected from polyurethane, polystyrene, or polyvinyl chloride.

The average diameter of said nano barium titanate is less than or equal to 100 nm.

Said organic binder is one or more selected from polyvinyl alcohol, carboxymethyl cellulose and methyl cellulose; said organic rheological agent is one or more selected from carboxymethyl cellulose and hydroxyhexyl cellulose; said organic dispersant is one or more selected from polyacrylamide, polyethyleneimine and polyacrylic acid amine.

Said surfactant is one or more selected from carboxymethyl cellulose and polyethyleneimine.

Said stabilizer is one or more selected from polyvinylpyrrolidone and sodium alginate.

Said reducing agent is one or more selected from hydrazine hydrate, sodium citrate, sodium borohydride, glucose and ascorbic acid.

Said buffering agent or buffer is selected from Tris-HCl, disodium hydrogen phosphate, and sodium dihydrogen phosphate buffer.

Said alkali is selected from sodium hydroxide and aqueous ammonia solution.

The technical solution of the present invention also comprises a kind of barium titanate foam ceramics loaded with micro/nano silver obtained by above mentioned preparation method.

Compared with the prior arts, this invention has following advantages:

1. The barium titanate foam ceramics prepared in the present invention are foam ceramics that have single chemical composition and pure barium titanate skeleton, this is because inorganic materials are not added or "in situ" formed in the preparation process, instead, organic additives have been decomposed during the high temperature sintering process, resulting in pure barium titanate foam ceramic with a single chemical composition, so it is conducive to retain the excellent properties of original barium titanate.

2. The barium titanate foam ceramic prepared in the present invention is a skeleton with high dielectric constant. This is because the nano barium titanate with high dielectric constant is chosen as the raw material, and other organic additives are decomposed during the sintering process. In addition, barium titanate is further ceramization during the sintering process at high temperature, exhibiting a higher dielectric constant.

3. In the invention, the barium titanate foam ceramics with high dielectric constant and three-dimensional network are used as the skeleton, and the nano silver is in situ loaded on the foam ceramic skeleton through utilizing the strong adhesion and self-reducing property of dopamine, followed by reduction with the reduction agent, the preparation is green, simple and controllable.

4. The barium titanate foam ceramics loaded with micro/nano silver prepared in the present invention integrate the excellent dielectric properties of barium titanate, good conductive and antibacterial properties of silver, which are a kind of multifunctional and high performance foam material. In addition, dopamine used in the preparation process and the presence of Ag particles after loading change the morphology and chemical structure of the skeleton of barium titanate foam ceramics, which lay the foundation for the modification, application and high performance of the foam ceramics.

5. The method for the preparation of barium titanate foam ceramics loaded with micro/nano silver provided in the present invention is simple, controllable, green, environmental friendly, and has wide applicability, so which is suitable for industrial production.

DETAILED DESCRIPTION OF THE INVENTION

The technical solution of the invention is further described by combining with the concrete drawings, embodiments and control examples as follows.

Embodiment 1

1) Preparation of Slurries 20 g of barium titanate (the average diameter is 100 nm) and 10 g of aqueous polyvinyl alcohol solution with a concentration of 10 wt % were sufficiently ground to obtain a slurry A; 5 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

Figure 1:
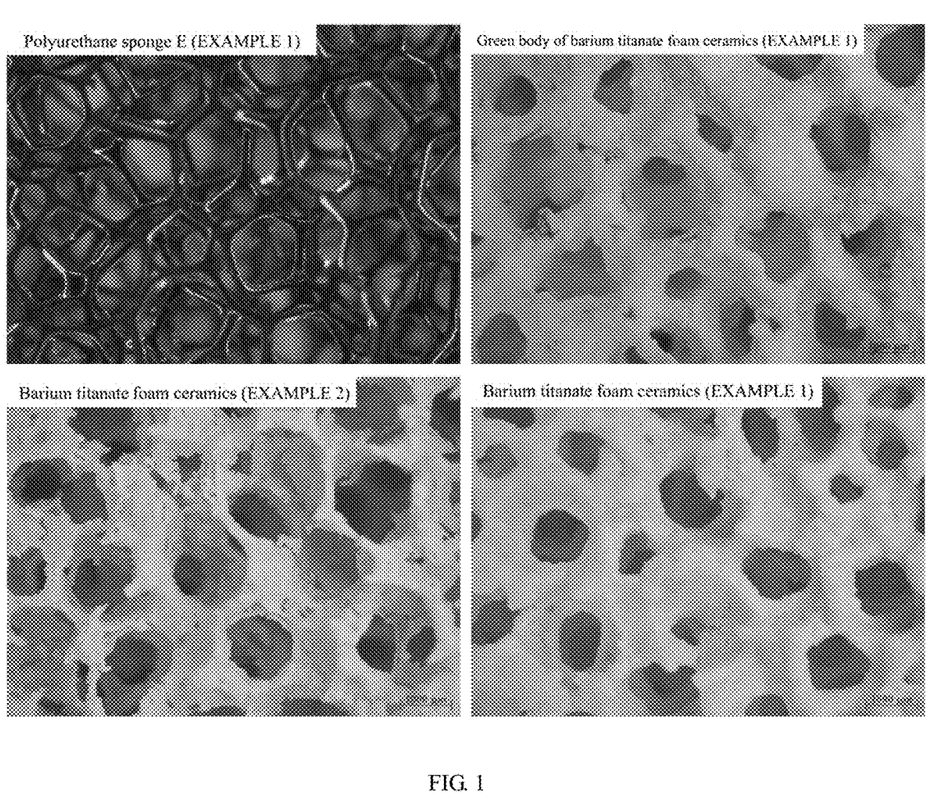
FIG. 1 is stereo microscope images of polyurethane sponge E, green body of barium titanate foam ceramics and barium titanate foam ceramics prepared in EMBODIMENT 1 and barium titanate foam ceramics prepared in EMBODIMENT 2 of the present invention.

The polyurethane sponge having a specification of 25 PPI was soaked in an aqueous sodium hydroxide solution with a concentration of 15 wt %, after heated up to 60° C., and kept at that temperature for 3.5 h; the polyurethane sponge was taken out and washed with deionized water, following by drying to obtain a polyurethane sponge D; at room temperature, the polyurethane sponge D was soaked in an aqueous carboxymethyl cellulose solution with a concentration of 1 wt % for 3 h; then took out and removed the excess carboxymethyl cellulose solution, after dried at 60° C., a pretreated polyurethane sponge E was obtained. Its stereo microscope image is shown in FIG. 1.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 40° C.; repeating processes of hanging pulp and drying for 4 times, a green body of foam ceramics based on barium titanate with even coating and no blocks was obtained. Its stereo microscope image is shown in FIG. 1.

4) Preparation of Barium Titanate Foam Ceramics

Figure 2:
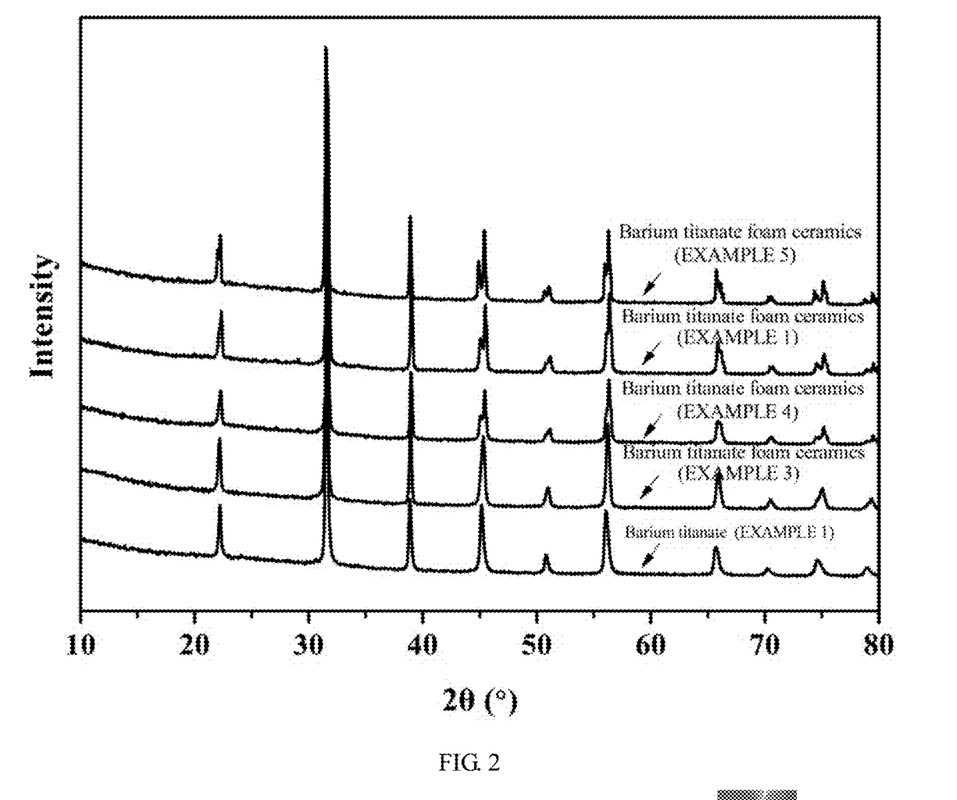
FIG. 2 is X-ray diffraction patterns of barium titanate foam ceramics prepared in EMBODIMENTS 1, 3, 4 and 5 of the present invention.

The green body of barium titanate foam ceramics prepared in step 3) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained. The stereo microscope image and X-ray diffraction pattern of the barium titanate foam ceramics are shown in FIGS. 1 and 2, respectively.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with sodium hydroxide; barium titanate foam ceramics prepared in step 4) were soaked in solution F and kept at room temperature for 24 h, followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 100 mL of aqueous sodium borohydride solution with a concentration of 20 g/L was added into the solution G and kept at room temperature for 2 h; followed by washing with deionized water and drying, successively, to obtain barium titanate foam ceramics loaded with micro/nano silver.

Embodiment 2

1) Preparation of Green Body of Barium Titanate Foam Ceramics

The pretreated polyurethane sponge E in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 2 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained. Its stereo microscope image is shown in FIG. 1.

3) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with sodium hydroxide; barium titanate foam ceramics prepared in step 2) were soaked in solution F and kept at room temperature for 12 h; followed by washing with deionized water for several times and drying, successively, to obtain dopamine-modified barium titanate foam ceramics.

4) Preparation of Barium Titanate Foam Ceramics Loaded with Micro/Nano Silver 10 mL of aqueous polyvinylpyrrolidone solution with a concentration of 0.1 wt % was added into 50 mL of a fresh ammoniacal silver solution with a concentration of 0.3 mol/L, the mixture was uniformly mixed to obtain solution G; the dopamine-modified barium titanate foam ceramics prepared in step 3) were soaked in solution G and kept at room temperature for 0.5 h to obtain barium titanate foam ceramics loaded with nano silver, then, 25 mL of aqueous hydrated hydrazine solution with a concentration of 30 g/L was added into the solution G and kept at room temperature for 5 h; followed by washing with deionized water and drying, successively, to obtain barium titanate foam ceramics loaded with micro/nano silver.

FIG. 1 is stereo microscope images of polyurethane sponge E, green body of barium titanate foam ceramics and barium titanate foam ceramics prepared in EMBODIMENT 1 and barium titanate foam ceramics prepared in EMBODIMENT 2 of the present invention. As shown in FIG. 1, barium titanate is evenly coated on the skeleton of the sponge after the pretreated polyurethane sponge E was coated with the slurry (EMBODIMENT 1). After sintering, the polyurethane sponge is decomposed at high temperature to obtain barium titanate foam ceramics with even pore distribution and no blocks (EMBODIMENTS 1 and 2). Compared with the barium titanate foam ceramics prepared in EMBODIMENT 2, the barium titanate foam ceramics prepared in EMBODIMENT 1 have a stouter skeleton because the content of slurry on the sponge skeleton increases as the number of coatings increases.

Embodiment 3

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1000° C. at a rate of 5° C./min and kept at that temperature for 2 h; after the furnace was cooled to room temperature, barium titanate foam ceramics were obtained. Its X-ray diffraction pattern is shown in FIG. 2.

2) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 10 g/L, and then solution F was obtained by adjusting pH to 8.5 with sodium hydroxide; barium titanate foam ceramics prepared in step 1) were soaked in solution F and kept at room temperature for 1 h; followed by washing with deionized water for several times and drying, successively, to obtain dopamine-modified barium titanate foam ceramics.

3) Preparation of Barium Titanate Foam Ceramics Loaded with Micro/Nano Silver 2 mL of aqueous polyvinylpyrrolidone solution with a concentration of 0.2 wt % and 3 mL of aqueous sodium alginate solution with a concentration of 0.2 wt % were added into 50 mL of a fresh ammoniacal silver solution with a concentration of 0.03 mol/L, the mixture was uniformly mixed to obtain solution G; the dopamine-modified barium titanate foam ceramics prepared in step 2) were soaked in solution G and kept at room temperature for 24 h to obtain barium titanate foam ceramics loaded with nano silver; then, 150 mL of aqueous sodium citrate solution with a concentration of 5 g/L was added into the solution G and kept at room temperature for 1 h; followed by washing with deionized water and drying, successively, to obtain barium titanate foam ceramics loaded with micro/nano silver.

Embodiment 4

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1100° C. at a rate of 5° C./min and kept at that temperature for 2 h; after the furnace was cooled to room temperature, barium titanate foam ceramics were obtained. Its X-ray diffraction pattern is shown in FIG. 2.

2) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 1) were soaked in solution F and kept at room temperature for 12 h; followed by washing with deionized water for several times and drying, successively, to obtain dopamine-modified barium titanate foam ceramics.

3) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 2) were soaked in solution G and kept at room temperature for 24 h to obtain barium titanate foam ceramics loaded with nano silver; then, 100 mL of aqueous sodium borohydride solution with a concentration of 20 g/L was added into the solution G and kept at room temperature for 2 h; followed by washing with deionized water and drying, successively, to obtain barium titanate foam ceramics loaded with micro/nano silver.

Embodiment 5

1) Preparation of Barium Titanate Foam Ceramics

Figure 3:
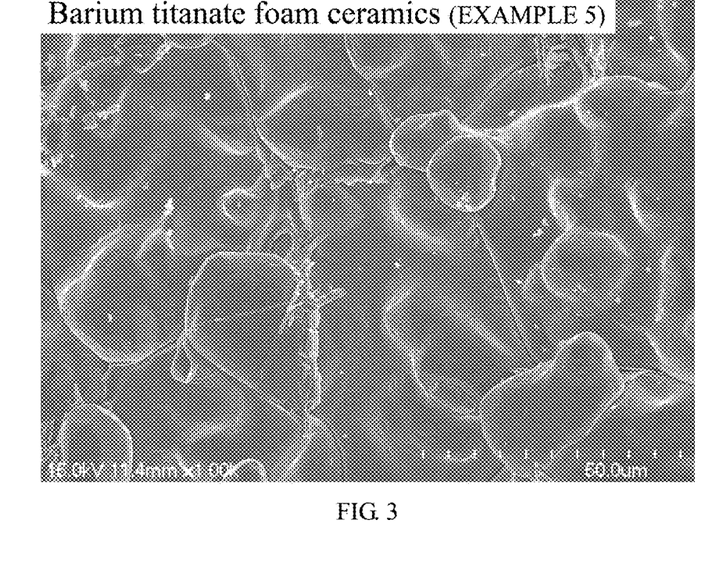
FIG. 3 is a scanning electron microscope image (×1,000) of barium titanate foam ceramics prepared in EMBODIMENT 5 in the invention.

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1300° C. at a rate of 5° C./min and kept at that temperature for 2 h; after the furnace was cooled to room temperature, barium titanate foam ceramics were obtained. Its X-ray diffraction pattern and scanning electron microscope image are shown in FIGS. 2 and 3, respectively.

2) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with sodium hydroxide; barium titanate foam ceramics prepared in step 1) were soaked in solution F and kept at room temperature for 24 h; followed by washing with deionized water for several times and drying, successively, to obtain dopamine-modified barium titanate foam ceramics.

3) Preparation of Barium Titanate Foam Ceramics Loaded with Micro/Nano Silver 10 mL of aqueous sodium alginate solution with a concentration of 0.1 wt % was added into 50 mL of a fresh ammoniacal silver solution with a concentration of 0.12 mol/L, the mixture was uniformly mixed to obtain solution G; the dopamine-modified barium titanate foam ceramics prepared in step 2) were soaked in solution G and kept at room temperature for 24 h to obtain barium titanate foam ceramics loaded with nano silver; then, 100 mL of aqueous ascorbic acid solution with a concentration of 1 g/L was added into the solution G and kept at room temperature for 2 h; followed by washing with deionized water and drying, successively, to obtain barium titanate foam ceramics loaded with micro/nano silver.

FIG. 2 displays X-ray diffraction patterns of barium titanate foam ceramics prepared in EMBODIMENTS 1, 3, 4 and 5 of the present invention. It can be seen that nano barium titanate exhibits significant diffraction peaks at 22.1°, 31.6°, 38.9°, 45.2°, 50.8°, 56.1°, 65.8°, 70.2°, 74.6° and 78.9°, corresponding to crystal planes of (100), (110), (111), (002)/(200), (210), (211), (220), (221), (310) and (113) (JCPDS No. 5-0626), respectively. Whether $2\theta$ at 45.2° is split into two diffraction peaks or not is an effective evidence for judging the crystalline form of barium titanate. Since the barium titanate foam ceramics prepared in EMBODIMENT 3 do not exhibit a split peak at 45.2°, it can be judged that the barium titanate foam ceramics prepared in EMBODIMENT 3 are cubic crystalloid. In contrast to EMBODIMENT 3, each pattern of the barium titanate foam ceramics prepared in EMBODIMENTS 1, 4 or 5 shows two split peaks at 45.2°, indicating that the crystalline form of the barium titanate foam ceramics transforms into tetragonal phase, and the intensity of the split peak increases obviously with the increase of sintering temperature, indicating that the content of tetragonal phase in barium titanate foam ceramics increases. Those results show that changing the sintering temperature can control the crystalline form and the content of different crystal phases of barium titanate foam ceramics. Note that there is no other impurity peak in all X-ray diffraction patterns, suggesting that organic additives have decomposed during the sintering process to obtain pure barium titanate foam ceramics with a single chemical composition.

FIG. 3 shows a scanning electron microscope image of barium titanate foam ceramics prepared in EMBODIMENT 5 of the present invention. As can be seen, after the green body of foam ceramics was sintered at high temperature, the organic additives have decomposed, the barium titanate grains grow and become larger, consequently, skeleton of obtain barium titanate foam ceramics with good density are obtained.

Above results indicate that barium titanate foam ceramics with a single chemical composition and good density have been successfully prepared.

Embodiment 6

1) Preparation of Green Body of Barium Titanate Foam Ceramics

The pretreated polyurethane sponge E in EMBODIMENT 1 was soaked in the slurry C (EMBODIMENT 1) and maintained for 5 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

2) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained. Its scanning electron microscope image and X-ray diffraction pattern are shown in FIGS. 4 and 5, respectively.

3) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 2) were soaked in solution F and kept at room temperature for 24 h; followed by washing with deionized water for several times and drying, successively, to obtain dopamine-modified barium titanate foam ceramics. Its scanning electron microscope image is shown in FIG. 4.

Figure 4:
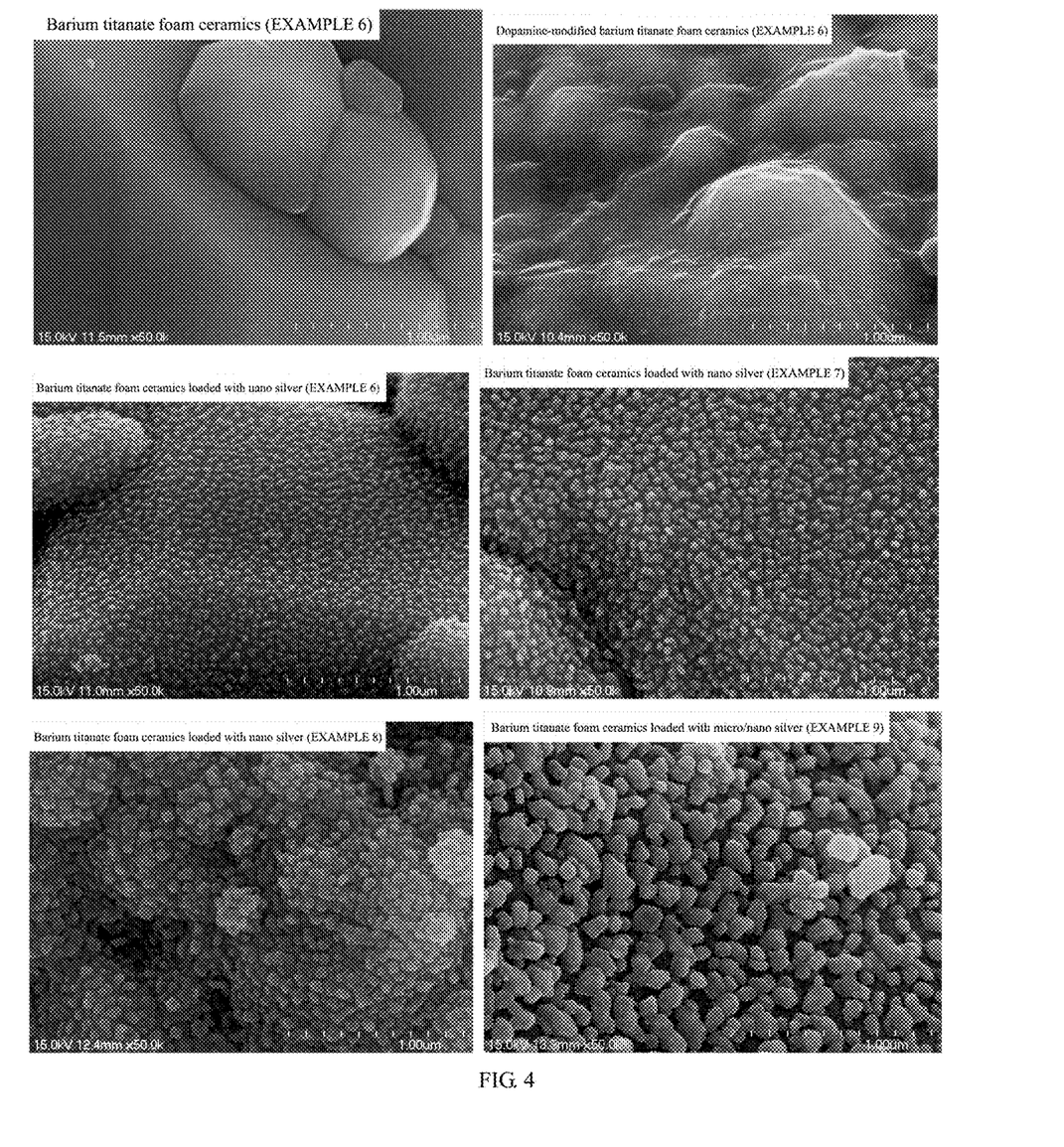
FIG. 4 is scanning electron microscope images (×50,000) of barium titanate foam ceramics and dopamine-modified barium titanate foam ceramics prepared in EMBODIMENT 6, barium titanate foam ceramics loaded with nano silver prepared in EMBODIMENTS 6, 7 and 8, and barium titanate foam ceramics loaded with micro/nano silver in EMBODIMENT 9 of the present invention.
Figure 5:
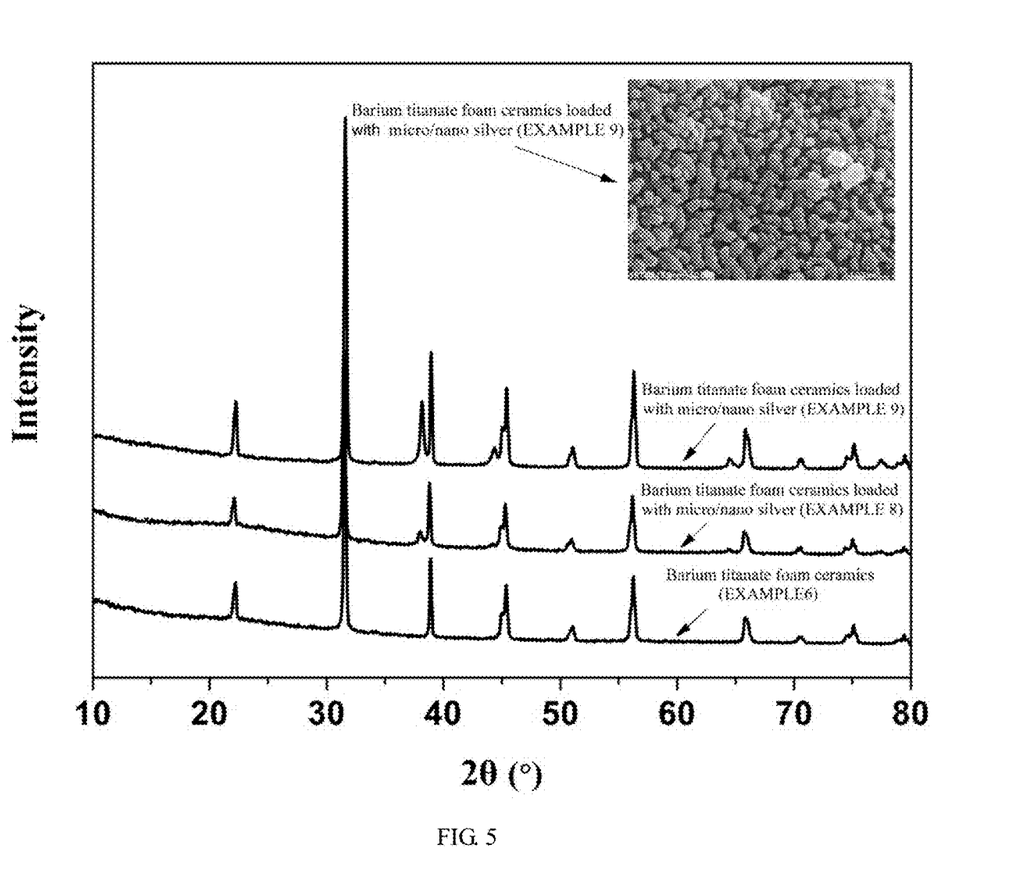
FIG. 5 is X-ray diffraction patterns of barium titanate foam ceramics prepared in EMBODIMENT 6, barium titanate foam ceramics loaded with nano silver prepared in EMBODIMENT 8, and barium titanate foam ceramics loaded with micro/nano silver prepared in EMBODIMENT 9 of the present invention.

4) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 3) were soaked in solution G and kept at room temperature for 2 h to obtain barium titanate foam ceramics loaded with nano silver, its scanning electron microscope image is shown in FIG. 4; then, 100 mL of aqueous glucose solution with a concentration of 1 g/L was added into the solution G and kept at room temperature for 2 h; followed by washing with deionized water and drying, successively, to obtain barium titanate foam ceramics loaded with micro/nano silver.

Embodiment 7

5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in EMBODIMENT 6 were soaked in solution G and kept at room temperature for 12 h to obtain barium titanate foam ceramics loaded with nano silver, its scanning electron microscope image is shown in FIG. 4; then, 100 mL of aqueous glucose solution with a concentration of 20 g/L was added into the solution G and kept at room temperature for 0.1 h; followed by washing with deionized water and drying, successively, to obtain barium titanate foam ceramics loaded with micro/nano silver.

Embodiment 8

5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in EMBODIMENT 6 were soaked in solution G and kept at room temperature for 24 h to obtain barium titanate foam ceramics loaded with nano silver, its scanning electron microscope image and X-ray diffraction pattern of barium titanate foam ceramics loaded with nano silver are shown in FIGS. 4 and 5, respectively; then, 100 mL of aqueous glucose solution with a concentration of 20 g/L was added into the solution G and kept at room temperature for 2 h; followed by washing with deionized water and drying, successively, to obtain barium titanate foam ceramics loaded with micro/nano silver.

Embodiment 9

5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in EMBODIMENT 6 were soaked in solution G and kept at room temperature for 0.5 h to obtain barium titanate foam ceramics loaded with nano silver; then, 100 mL of aqueous glucose solution with a concentration of 20 g/L was added into the solution G and kept at room temperature for 1 h; followed by washing with deionized water and drying, successively, to obtain barium titanate foam ceramics loaded with micro/nano silver. The scanning electron microscope (SEM) image and X-ray diffraction pattern of barium titanate foam ceramics loaded with micro/nano silver are shown in FIGS. 4 and 5, respectively.

FIG. 4 gives SEM images of barium titanate foam ceramics and dopamine-modified barium titanate foam ceramics prepared in EMBODIMENT 6, barium titanate foam ceramics loaded with nano silver prepared in EMBODIMENTS 6, 7 and 8, and barium titanate foam ceramics loaded with micro/nano silver prepared in EMBODIMENT 9. It can be seen that the barium titanate foam ceramics (EMBODIMENT 6) have a coating layer on the surface of barium titanate foam ceramics (EMBODIMENT 6) after treated with dopamine. After dopamine-modified barium titanate foam ceramics react with the ammoniacal silver solution, fine particles appear on the surface thereof, and the particles size on the surface becomes larger with the increase of reaction time (EMBODIMENTS 6, 7 and 8). After further reduction using glucose, the particle size of Ag particles translated from nanometer to micron (EMBODIMENT 9).

FIG. 5 is X-ray diffraction patterns of barium titanate foam ceramics prepared in EMBODIMENT 6, barium titanate foam ceramics loaded with nano silver prepared in EMBODIMENT 8, and barium titanate foam ceramics loaded with micro/nano silver prepared in EMBODIMENT 9. As can be seen, compared to barium titanate foam ceramics (EMBODIMENT 6), there are four significant diffraction peaks exhibiting at 38.1°, 44.3°, 64.5° and 77.4° after loading with micro/nano silver, corresponding to crystal planes of (111), (200), (220) and (311) (JCPDS No. 04-0783), respectively. It can be judged that the particles loaded in EMBODIMENTS 8 and 9 are face-centered cubic silver. At the same time, the diffraction peak of barium titanate foam ceramics loaded with micro/nano silver is enhanced by further reduction using glucose solution (EMBODIMENT 9).

Embodiment 10

5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in EMBODIMENT 6 were soaked in solution G and kept at room temperature for 1 h to obtain barium titanate foam ceramics loaded with nano silver; then, 100 mL of aqueous glucose solution with a concentration of 20 g/L was added into the solution G and kept at room temperature for 1.5 h; followed by washing with deionized water and drying, successively, to obtain barium titanate foam ceramics loaded with micro/nano silver.

Embodiment 11

1) Preparation of Slurries 20 g of barium titanate (the average diameter is 50 nm) and 6 g of aqueous polyvinyl alcohol solution with a concentration of 10 wt % and 18 g of aqueous carboxymethyl cellulose solution with a concentration of 1 wt % were sufficiently ground to obtain a slurry A; 5 g of aqueous carboxymethyl cellulose solution with a concentration of 0.5 wt % and 5 g of aqueous hydroxyhexyl cellulose solution with a concentration of 3 wt % were added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 20 wt %, after heated up to 50° C., and kept at that temperature for 2 h; the polyurethane sponge was taken out and washed with deionized water, following by drying to obtain a polyurethane sponge D; at room temperature, the polyurethane sponge D was soaked in an aqueous polyethyleneimine solution with a concentration of 3 wt % for 2 h; then took out and removed the excess polyethyleneimine solution, after dried at 80° C., a pretreated polyurethane sponge E was obtained.

3) Preparation of Green Body of Barium Titanate Foam Ceramics

The pretreated polyurethane sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 5 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 0.5 h; after that, continuously heated to 1300° C. at a rate of 2° C./min and kept at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 5 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous polyvinylpyrrolidone solution with a concentration of 0.2 wt % and 5 mL of aqueous sodium alginate solution with a concentration of 0.2 wt % were added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 50 mL of aqueous sodium citrate solution with a concentration of 10 g/L, 50 mL of aqueous ascorbic acid solution with a concentration of 1 g/L and 50 mL of aqueous glucose solution with a concentration of 10 g/L were added into the solution G and kept at room temperature for 2 h; followed by washing with deionized water and drying, successively, to obtain barium titanate foam ceramics loaded with micro/nano silver.

Embodiment 12

1) Preparation of Slurries 20 g of barium titanate (the average diameter is 100 nm) and 6 g of aqueous methyl cellulose solution with a concentration of 15 wt % were sufficiently ground to obtain a slurry A; 16 g of aqueous carboxymethyl cellulose solution with a concentration of 0.5 wt % was added into the slurry A, and the mixture was sufficiently ground to obtain a slurry B; 10 g of aqueous polyacrylamide solution with a concentration of 0.5 wt % and 6 g of aqueous polyacrylic acid amine solution with a concentration of 0.5 wt % were added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 10 wt %, after heated up to 60° C., and kept at that temperature for 3.5 h; the polyurethane sponge was taken out and washed with deionized water, following by drying to obtain a polyurethane sponge D; at room temperature, the polyurethane sponge D was soaked in an aqueous polyethyleneimine solution with a concentration of 0.5 wt % for 3 h; then took out and removed the excess polyethyleneimine solution, after dried at 40° C., a pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 80° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 5° C./min, and then raised to 600° C. at a rate of 5° C./min and maintained at 600° C. for 0.5 h; after that, continuously heated to 1000° C. at a rate of 10° C./min and kept at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 50 mL of aqueous sodium citrate solution with a concentration of 10 g/L and 50 mL of aqueous glucose solution with a concentration of 10 g/L were added into the solution G and kept at room temperature for 2 h; followed by washing with deionized water and drying, successively, to obtain barium titanate foam ceramics loaded with micro/nano silver.

Embodiment 13

1) Preparation of Slurries 20 g of barium titanate (the average diameter is 30 nm) and 10 g of aqueous carboxymethyl cellulose solution with a concentration of 1 wt % and 10 g of aqueous methyl cellulose solution with a concentration of 1 wt % were sufficiently ground to obtain a slurry A; 2 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % and 6 g of aqueous polyethyleneimine solution with a concentration of 1 wt % were added into the slurry B, and the mixture was sufficiently ground to obtain a slurry C.

2) Treatment of Polyurethane Sponge

The polyurethane sponge having a specification of 35 PPI was soaked in an aqueous sodium hydroxide solution with a concentration of 15 wt %, after heated up to 60° C., and kept at that temperature for 3.5 h; the polyurethane sponge was taken out and washed with deionized water, following by drying to obtain a polyurethane sponge D; at room temperature, the polyurethane sponge D was soaked in a mixed solution by equal volume of aqueous carboxymethyl cellulose solution with a concentration of 1 wt % and aqueous polyethyleneimine solution with a concentration of 1 wt % for 3 h; then took out and removed the excess mixed solution of carboxymethyl cellulose solution and polyethyleneimine solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 2° C./min, and then raised to 600° C. at a rate of 1° C./min and maintained at 600° C. for 1 h; after that, continuously heated to 1000° C. at a rate of 2° C./min and kept at that temperature for 1 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 2 h to obtain barium titanate foam ceramics loaded with nano silver; then, 50 mL of aqueous sodium citrate solution with a concentration of 10 g/L was added into the solution G and kept at room temperature for 2 h; followed by washing with deionized water and drying, successively, to obtain barium titanate foam ceramics loaded with micro/nano silver.

Embodiment 14

1) Preparation of Slurries 20 g of barium titanate (the average diameter is 50 nm) and 6 g of aqueous polyvinyl alcohol solution with a concentration of 10 wt % and 10 g of aqueous carboxymethyl cellulose solution with a concentration of 1 wt % were sufficiently ground to obtain a slurry A; 5 g of aqueous carboxymethyl cellulose solution with a concentration of 2 wt % was added into the slurry A, and the mixture was sufficiently ground to obtain a slurry B; 5 g of aqueous polyacrylamide solution with a concentration of 1 wt % and 5 g of aqueous polyethyleneimine solution with a concentration of 1 wt % were added into the slurry B, and the mixture was sufficiently ground to obtain a slurry C.

2) Treatment of Polyvinyl Chloride Sponge

The polyvinyl chloride sponge having a specification of 15 PPI was soaked in an aqueous sodium hydroxide solution with a concentration of 20 wt %, after heated up to 60° C., and kept at that temperature for 2 h; the polyvinyl chloride sponge was taken out and washed with deionized water, following by drying to obtain a polyvinyl chloride D; at room temperature, the polyvinyl chloride D was soaked in an aqueous carboxymethyl cellulose solution with a concentration of 0.5 wt % for 3 h; then took out and removed the excess carboxymethyl cellulose solution, after dried at 60° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 5 min at room temperature; after hanging pulp, the excess slurry in the sponge was removed by extrusion, and the sponge was dried at 40° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 2 h; after that, continuously heated to 1200° C. at a rate of 5° C./min and kept at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with aqueous ammonia solution; barium titanate foam ceramics prepared in step 4) were soaked in solution F and kept at room temperature for 12 h; followed by washing with deionized water for several times and drying, successively, to obtain dopamine-modified barium titanate foam ceramics.

6) Preparation of Barium Titanate Foam Ceramics Loaded with Micro/Nano Silver 10 mL of aqueous polyvinylpyrrolidone solution with a concentration of 0.1 wt % was added into 50 mL of a fresh ammoniacal silver solution with a concentration of 0.3 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 25 mL of aqueous hydrazine hydrate solution with a concentration of 30 g/L was added into the solution G and kept at room temperature for 5 h; followed by washing with deionized water and drying, successively, to obtain barium titanate foam ceramics loaded with micro/nano silver.

Embodiment 15

1) Preparation of Slurries 20 g of barium titanate (the average diameter is 30 nm) and 24 g of aqueous methyl cellulose solution with a concentration of 1 wt % were sufficiently ground to obtain a slurry A; 4 g of aqueous hydroxyhexyl cellulose solution with a concentration of 3 wt % was added into the slurry A, and the mixture was sufficiently ground to obtain a slurry B; 16 g of aqueous polyethyleneimine solution with a concentration of 0.5 wt % was added into the slurry B, and the mixture was sufficiently ground to obtain a slurry C.

2) Treatment of Polystyrene Sponge

The polystyrene sponge having a specification of 25 PPI was soaked in an aqueous sodium hydroxide solution with a concentration of 5 wt %, after heated up to 75° C., and kept at that temperature for 6 h; the polystyrene sponge was taken out and washed with deionized water, following by drying to obtain a polystyrene sponge D; at room temperature, the polystyrene sponge D was soaked in an aqueous polyethyleneimine solution with a concentration of 3 wt % for 2 h; then took out and removed the excess polyethyleneimine solution, after dried at 60° C., the pretreated polystyrene sponge E was obtained.

3) Preparation of Green Body of Barium Titanate Foam Ceramics

The pretreated polystyrene sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 7 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 2 h; after that, continuously heated to 1000° C. at a rate of 10° C./min and kept at that temperature for 5 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 12 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 24 h to obtain barium titanate foam ceramics loaded with nano silver; then, 50 mL of aqueous sodium citrate solution with a concentration of 10 g/L and 50 mL of aqueous glucose solution with a concentration of 10 g/L were added into the solution G and kept at room temperature for 2 h; followed by washing with deionized water and drying, successively, to obtain barium titanate foam ceramics loaded with micro/nano silver.

Embodiment 16

1) Preparation of Slurries 20 g of barium titanate (the average diameter is 50 nm) and 6 g of aqueous polyvinyl alcohol solution with a concentration of 15 wt % were sufficiently ground to obtain a slurry A; 16 g of aqueous hydroxyhexyl cellulose solution with a concentration of 0.5 wt % was added into the slurry A, and the mixture was sufficiently ground to obtain a slurry B; 8 g of aqueous polyacrylic acid amine solution with a concentration of 3 wt % was added into the slurry B, and the mixture was sufficiently ground to obtain a slurry C.

2) Treatment of Polyvinyl Chloride Sponge

The polyvinyl chloride sponge having a specification of 25 PPI was soaked in an aqueous sodium hydroxide solution with a concentration of 20 wt %, after heated up to 50° C., and kept at that temperature for 2 h; the polyvinyl chloride sponge was taken out and washed with deionized water, following by drying to obtain a polyvinyl chloride sponge D; at room temperature, the polyvinyl chloride sponge D was soaked in an aqueous polyethyleneimine solution with a concentration of 0.5 wt % for 2 h; then took out and removed the excess polyethyleneimine solution, after dried at 70° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 1 min at room temperature; after hanging pulp, the excess slurry in the sponge was removed by extrusion, and the sponge was dried at 70° C.; repeating processes of hanging pulp and drying for 1 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 100° C. at a rate of 5° C./min, and then raised to 500° C. at a rate of 0.5° C./min and maintained at 500° C. for 0.5 h; after that, continuously heated to 1500° C. at a rate of 10° C./min and kept at that temperature for 3 h; after the furnace was cooled to room temperature, barium titanate foam ceramics were obtained.

5) Preparation of Dopamine-Modified Barium Titanate Foam Ceramics

Dopamine hydrochloride was dissolved in 12.5 mmol/L buffer solution of disodium hydrogen phosphate-sodium dihydrogen phosphate to prepare aqueous dopamine solution with a concentration of 2 g/L, and then solution F was obtained by adjusting pH to 8.3 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 12 h to obtain barium titanate foam ceramics loaded with nano silver; then, 50 mL of aqueous hydrazine hydrate solution with a concentration of 30 g/L and 50 mL of aqueous sodium borohydride solution with a concentration of 10 g/L were added into the solution G and kept at room temperature for 1 h; followed by washing with deionized water and drying, successively, to obtain barium titanate foam ceramics loaded with micro/nano silver.

Embodiment 17

1) Preparation of Slurries 20 g of barium titanate (the average diameter is 100 nm) and 15 g of aqueous polyvinyl alcohol solution with a concentration of 10 wt % were sufficiently ground to obtain a slurry A; 10 g of aqueous carboxymethyl cellulose solution with a concentration of 1 wt % was added into the slurry A, and the mixture was sufficiently ground to obtain a slurry B; 5 g of aqueous polyacrylic acid amine solution with a concentration of 2 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 15 wt %, after heated up to 65° C., and kept at that temperature for 3 h; the polyurethane sponge was taken out and washed with deionized water, following by drying to obtain a polyurethane sponge D; at room temperature, the polyurethane sponge D was soaked in an aqueous polyethyleneimine solution with a concentration of 0.5 wt % for 6 h; then took out and removed the excess polyethyleneimine solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 3 min at room temperature; after hanging pulp, the excess slurry in the sponge was removed by extrusion, and the sponge was dried at 40° C.; repeating processes of hanging pulp and drying for 7 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 300° C. at a rate of 2° C./min, and then raised to 700° C. at a rate of 2° C./min and maintained at 700° C. for 2 h; after that, continuously heated to 1200° C. at a rate of 8° C./min and kept at that temperature for 3 h; after the furnace was cooled to room temperature, barium titanate foam ceramics were obtained.

5) Preparation of Dopamine-Modified Barium Titanate Foam Ceramics

Dopamine hydrochloride was dissolved in 15 mmol/L buffer solution of disodium hydrogen phosphate-sodium dihydrogen phosphate to prepare aqueous dopamine solution with a concentration of 2 g/L, and then solution F was obtained by adjusting pH to 8.8 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 50 mL of aqueous ascorbic acid solution with a concentration of 1 g/L and 50 mL of aqueous sodium citrate solution with a concentration of 10 g/L were added into the solution G and kept at room temperature for 2 h; followed by washing with deionized water and drying, successively, to obtain barium titanate foam ceramics loaded with micro/nano silver.

What we claim:

1. A preparation method of barium titanate foam ceramics loaded with micro/nano silver, wherein comprising the following steps:
   (1) by weight, 100 parts of nano barium titanate and 30 to 120 parts of an aqueous solution of organic binder with a concentration of 1 to 15 wt % are sufficiently ground to obtain a slurry A; 10 to 80 parts of an aqueous solution of organic rheological agent with a concentration of 0.5 to 3 wt % are added into the slurry A to form a first mixture, and the first mixture is sufficiently ground to obtain a slurry B; 20 to 80 parts of an aqueous solution of organic dispersant with a concentration of 0.5 to 3 wt % are added into the slurry B to form a second mixture, and the second mixture is sufficiently ground to obtain a slurry C;

(2) a polymer sponge having a specification of 15 to 35 PPI is soaked in an aqueous solution of sodium hydroxide with a concentration of 5 to 20 wt %, after heated up to 50 to 75° C. and kept at that temperature for 2 to 6 h, the polymer sponge is taken out and washed with deionized water, following by drying to obtain a polymer sponge D; at room temperature, the polymer sponge D is soaked in an aqueous surfactant solution with a concentration of 0.5 to 3 wt % for 2 to 6 h, then took out and removed the excess surfactant, after dried at 40 to 80° C., a pretreated polymer sponge E is obtained;

(3) the pretreated polymer sponge E is soaked in the slurry C prepared in step (1), and maintained for 1 to 10 min at room temperature, an excess slurry in the sponge is removed by extrusion, and the sponge is dried at 40 to 80° C.; repeating processes of removing the excess slurry and drying for 1 to 7 times, a green body of foam ceramics based on barium titanate is obtained;

(4) the green body of barium titanate foam ceramics prepared in step (3) is heated from room temperature to 100-300° C. at a rate of 0.5-5° C./min, and then raised to 500-700° C. at a rate of 0.5-5° C./min and maintained at that temperature for 0.5-2 h, after that, continuously heated to 1000-1500° C. at a rate of 2-10° C./min and kept at that temperature for 1-5 h, after the furnace is cooled to room temperature, barium titanate foam ceramics are obtained;

(5) using buffering agent or buffer, water and dopamine hydrochloride to prepare dopamine aqueous solution with a concentration of 0.5-10 g/L; of which pH value is adjusted to 8.3-8.8 with alkali to obtain solution F; barium titanate foam ceramics prepared in step (4) are soaked in solution F and kept at room temperature for 1 to 24 h, followed by washing with deionized water and drying successively, to obtain dopamine-modified barium titanate foam ceramics;

(6) by volume, 4 to 20 parts of stabilizer aqueous solution with a concentration of 0.1-1 wt % are added into 100 parts of a fresh ammoniacal silver solution with a concentration of 0.03-0.3 mol/L to form a third mixture, the third mixture is uniformly mixed to obtain solution G; the dopamine-modified barium titanate foam ceramics prepared in step (5) are soaked in solution G and kept at room temperature for 0.5-24 h to obtain barium titanate foam ceramics loaded with nano silver, into which 50-300 parts of reducing agent aqueous solution having a concentration of 1-30 g/L are added and kept at room temperature for 0.1-5 h, followed by washing with deionized water and drying successively, to obtain barium titanate foam ceramics loaded with micro/nano silver.

2. The preparation method of barium titanate foam ceramics loaded with micro/nano silver according to claim 1, wherein said polymer sponge includes a polymer material selected from the group consisting of polyurethane, polystyrene, and polyvinyl chloride.

3. The preparation method of barium titanate foam ceramics loaded with micro/nano silver according to claim 1, wherein said nano barium titanate has an average diameter of less than or equal to 100 nm.

4. The preparation method of barium titanate foam ceramics loaded with micro/nano silver according to claim 1, wherein said organic binder is one or more selected from the group consisting of polyvinyl alcohol, carboxymethyl cellulose and methyl cellulose; said organic rheological agent is one or more selected from the group consisting of carboxymethyl cellulose and hydroxyhexyl cellulose; said organic dispersant is one or more selected from the group consisting of polyacrylamide, polyethyleneimine and polyacrylic acid amine.

5. The preparation method of barium titanate foam ceramics loaded with micro/nano silver according to claim 1, wherein said surfactant is one or more selected from the group consisting of carboxymethyl cellulose and polyethyleneimine.

6. The preparation method of barium titanate foam ceramics loaded with micro/nano silver according to claim 1, wherein said stabilizer is one or more selected from the group consisting of polyvinylpyrrolidone and sodium alginate.

7. The preparation method of barium titanate foam ceramics loaded with micro/nano silver according to claim 1, wherein said reducing agent is one or more selected from the group consisting of hydrazine hydrate, sodium citrate, sodium borohydride, glucose and ascorbic acid.

8. The preparation method of barium titanate foam ceramics loaded with micro/nano silver according to claim 1, wherein said buffering agent or buffer is selected from the group consisting of Tris-HCl, disodium hydrogen phosphate, and sodium dihydrogen phosphate buffer.

9. The preparation method of barium titanate foam ceramics loaded with micro/nano silver according to claim 1, wherein said alkali is selected from the group consisting of sodium hydroxide and aqueous ammonia solution.

10. Barium titanate foam ceramics loaded with micro/nano silver prepared through the preparation method according to claim 1.

* * * * *